United States Patent
Pelger et al.

(10) Patent No.: US 10,359,150 B2
(45) Date of Patent: Jul. 23, 2019

(54) SYSTEM FOR STORING A PRESSURIZED GAS AND METHOD FOR EMPTYING A STORAGE CONTAINER FOR A PRESSURIZED GAS

(71) Applicant: Bayerische Motoren Werke Aktiengesellschaft, Munich (DE)

(72) Inventors: Andreas Pelger, Ismaning (DE); Klaas Kunze, Munich (DE); Bastian Landeck, Unterhaching (DE); Jan-Mark Kunberger, Munich (DE); Stefan Schott, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1 day.

(21) Appl. No.: 15/277,295

(22) Filed: Sep. 27, 2016

(65) Prior Publication Data

US 2017/0016579 A1    Jan. 19, 2017

Related U.S. Application Data

(63) Continuation of application No. PCT/EP2015/053342, filed on Feb. 17, 2015.

(30) Foreign Application Priority Data

Mar. 27, 2014  (DE) .......................... 10 2014 205 712

(51) Int. Cl.
*F16K 31/02*     (2006.01)
*F17C 13/12*     (2006.01)

(52) U.S. Cl.
CPC ............ *F17C 13/12* (2013.01); *F16K 31/025* (2013.01); *F17C 2201/056* (2013.01);
(Continued)

(58) Field of Classification Search
CPC ................ F17C 13/12; F17C 2201/056; F17C 2205/0317; F17C 2205/0332;
(Continued)

(56) References Cited

U.S. PATENT DOCUMENTS 2,564,295 A * 8/1951 Benz ....................... F16K 17/38
137/522
3,811,511 A * 5/1974 McCulloch ............ A62C 35/08
169/28

(Continued)

FOREIGN PATENT DOCUMENTS

DE    102010006516 A1 *  8/2011  ............. F16K 13/06
WO    WO 2004014683 A1 *  2/2004  ............. F17C 13/026

*Primary Examiner* — Reinaldo Sanchez-Medina
*Assistant Examiner* — David Colon-Morales
(74) *Attorney, Agent, or Firm* — Crowell & Moring LLP

(57) ABSTRACT

A system for storing a pressurized gas in a motor vehicle is provided, having a storage container and at least one thermally activatable safety valve for emptying the storage container. The safety valve activates automatically at a corresponding high temperature. The storage container has an additional activatable emptying device, which has an interface for an external energy source. The interface can be connected to the external energy source in order to empty the storage container in a targeted manner. Also provided is a method for emptying a storage container for a pressurized gas in a motor vehicle.

20 Claims, 2 Drawing Sheets

(52) U.S. Cl.
CPC .......... *F17C 2205/0317* (2013.01); *F17C 2205/0332* (2013.01); *F17C 2221/012* (2013.01); *F17C 2221/033* (2013.01); *F17C 2223/0123* (2013.01); *F17C 2223/036* (2013.01); *F17C 2250/043* (2013.01); *F17C 2250/0439* (2013.01); *F17C 2260/037* (2013.01); *F17C 2260/042* (2013.01); *F17C 2270/0178* (2013.01); *Y02E 60/321* (2013.01); *Y10T 137/1963* (2015.04); *Y10T 137/1987* (2015.04)

(58) Field of Classification Search
CPC .......... F17C 2221/012; F17C 2221/033; F17C 2223/0123; F17C 2223/036; F17C 2250/043; F17C 2250/0439; F17C 2260/037; F17C 2260/042; F17C 2270/0178; F17C 2205/0326; F17C 2205/0323; F17C 2205/0311; F16K 31/025; F16K 17/38; F16K 17/383; F16K 17/40; F16K 17/403; F16K 17/406; Y02E 60/321; Y10T 137/1963; Y10T 137/1987; Y10T 137/1797; Y10T 137/1804
USPC .............................. 251/11, 89.4; 137/79, 80
See application file for complete search history.

(56) References Cited

U.S. PATENT DOCUMENTS

| | | | | | |
|---|---|---|---|---|---|
| 4,043,128 | A * | 8/1977 | Bendler | ............ | A62C 2/248 137/68.13 |
| 4,185,204 | A * | 1/1980 | Fima | ............ | H02G 3/14 307/10.1 |
| 4,223,692 | A * | 9/1980 | Perry | ............ | F16K 17/30 137/460 |
| 4,409,879 | A * | 10/1983 | Cobb, Jr. | ............ | F42B 3/006 137/72 |
| 5,197,710 | A * | 3/1993 | Wass | ............ | F17C 13/04 222/3 |
| 5,848,604 | A * | 12/1998 | Eihusen | ............ | F16K 17/383 137/72 |
| 5,975,160 | A * | 11/1999 | Rush | ............ | B67D 7/3218 137/885 |
| 6,269,011 | B1 * | 7/2001 | Ohshima | ............ | H02H 3/087 323/908 |
| 6,286,536 | B1 * | 9/2001 | Kamp | ............ | F16K 17/38 137/68.13 |
| 6,382,232 | B1 * | 5/2002 | Portmann | ............ | F16K 13/06 102/275.1 |
| 6,922,144 | B2 * | 7/2005 | Bulin | ............ | F17C 13/02 340/539.22 |
| 7,337,799 | B2 * | 3/2008 | Delfino | ............ | B60K 15/03006 137/266 |
| 7,721,750 | B2 * | 5/2010 | Lindner | ............ | F24J 1/00 137/72 |
| 8,627,841 | B2 * | 1/2014 | Hirakata | ............ | F17C 13/025 137/73 |
| 8,636,165 | B2 * | 1/2014 | Handa | ............ | B60K 15/03006 137/79 |
| 8,794,254 | B2 * | 8/2014 | Maier | ............ | F16J 13/24 137/2 |
| 2009/0000406 | A1 * | 1/2009 | Brazier | ............ | F16K 17/1626 73/865.8 |
| 2009/0165867 | A1 * | 7/2009 | Andreas | ............ | F17C 13/123 137/68.11 |
| 2011/0083756 | A1 * | 4/2011 | Hwang | ............ | F16K 17/383 137/488 |
| 2013/0087214 | A1 * | 4/2013 | Dorr | ............ | F16K 17/383 137/79 |

* cited by examiner

SYSTEM FOR STORING A PRESSURIZED GAS AND METHOD FOR EMPTYING A STORAGE CONTAINER FOR A PRESSURIZED GAS

CROSS REFERENCE TO RELATED APPLICATIONS

This application is a continuation of PCT International Application No. PCT/EP2015/053342, filed Feb. 17, 2015, which claims priority under 35 U.S.C. § 119 from German Patent Application No. 10 2014 205 712.4, filed Mar. 27, 2014, the entire disclosures of which are herein expressly incorporated by reference.

BACKGROUND AND SUMMARY OF THE INVENTION

The invention relates to a system for storing a pressurized gas in a motor vehicle, the system having a storage vessel and at least one thermally activatable safety valve for the evacuation of the storage vessel, which safety valve self-activates in the presence of a corresponding high temperature. The invention also relates to a method for the evacuation of a storage vessel for a pressurized gas in a motor vehicle.

In the context of alternative drive concepts, vehicles are increasingly being developed which are operated with gas, for example natural gas or hydrogen. Such vehicles require a storage vessel for the highly pressurized gas, and certain safety devices that ensure the pressure prevailing in the storage vessel does not reach the burst pressure of the vessel, in order to prevent bursting of the storage vessel.

For a fire situation, said storage vessels are further equipped with thermally activatable safety valves (Thermal Pressure Relief Devices, TPRD), which self-activate in the presence of a correspondingly high temperature, for example, by virtue of a closure compound melting. It can thus be achieved that the pressurized-gas storage vessel is evacuated before the vessel bursts owing to the excessively high internal pressure.

It is contemplated for the storage vessel to sustain prior damage, for example, in the event of an accident. This may lower the burst pressure of the storage vessel to below the operating pressure, or at least to below the triggering pressure of the safety devices that are provided, such that the damaged vessel constitutes a potential safety risk for as long as it is still pressurized. A pressurized-gas storage vessel of said type duly normally has so-called service valves by way of which manual evacuation is possible. But these service valves may, under some circumstances, be arranged on the vehicle at a poorly accessible location, or may be difficult to access as a result of the accident that has occurred. Also, a service function that may be provided for the release of pressure via a so-called service port may no longer be available in the event of an accident, owing to the elimination of the on-board electrical system.

It is therefore often not possible for the storage vessel to be targetedly evacuated, and for the system to thus be placed into a stable state, after an accident.

DE 10 2010 006 516 A1 has disclosed a generic system for storing a pressurized gas in a vehicle, wherein, in the event of an accident, an active safety system, which for example also triggers an airbag, transmits an activation signal to an evacuation device. The activation signal causes an explosive charge to be ignited, which may be arranged in the region of a thermally activatable safety valve, and the storage vessel is thus evacuated. Said document also discusses the possibility of the explosive charge being triggered from outside the vehicle by radio, wherein a radio transmitter carried by rescue forces transmits a signal to the vehicle safety system, which then generates the activation signal to the evacuation device.

A disadvantage of the described configuration is that, in the event of an accident-induced failure of the vehicle electronics, the possibility for the targeted evacuation of the pressurized-gas storage vessel no longer exists.

By contrast, the invention provides a system for storing a pressurized gas in a motor vehicle and a method for the evacuation of a storage vessel for a pressurized gas, in the case of which a targeted evacuation of the pressurized-gas storage vessel is reliably possible in a demand situation.

According to an aspect of the invention, in the case of a system of the type mentioned above, an additional, activatable evacuation device for the storage vessel is provided. The evacuation device has an interface for an external energy source, to which interface the external energy source can be connected for the purposes of targetedly evacuating the storage vessel. Thus, after an accident, regardless of the functional capability of the vehicle electronics, it is possible for the energy required for targetedly evacuating the storage vessel by way of the activatable evacuation device to be provided by connecting an external energy source (that is to say one which does not belong to the vehicle).

According to a further aspect of the invention, the additional evacuation device comprises a triggering device provided on the thermally activatable safety valve. The external energy source can be connected to the interface of the triggering device for the purposes of targetedly triggering the safety valve. Thus, use is made of the thermally activatable safety valve that is provided in any case, which safety valve, after connection of the external energy source, is triggered in targeted fashion and thus evacuates the storage vessel. A simple and thus inexpensive embodiment is obtained in this way.

It would alternatively be conceivable for an additional valve to be provided as evacuation device, which additional valve is arranged in parallel with respect to the thermally activatable safety valve and is activated by way of the external energy source.

The interface preferably has terminals, in particular, electrical terminals, for the external energy source. The terminals are arranged in a region of the motor vehicle that is accessible from the outside. This makes it possible, for example, for rescue forces to targetedly evacuate the pressurized gas in the storage vessel after an accident in order to prevent bursting of the storage vessel at a later point in time, for example, when the vehicle is transported away.

According to a further aspect of the invention, the external energy source can, after connection to the evacuation device, be externally activated in order to evacuate the storage vessel. In this way, the time of the evacuation can be precisely determined and targetedly delayed.

The activation is preferably performed by remote control, in particular, by radio or via an electrical ignition line. This makes it possible for the vehicle owner and other persons that are present to firstly move a safe distance away from the vehicle before the storage vessel is evacuated in targeted fashion.

If the evacuation device comprises a triggering device provided on the safety valve, the triggering device preferably has a thermal actuator, in particular, an electric heater. This may for example be in the form of a heating resistor and must be dimensioned such that the triggering temperature of the thermally activatable safety valve (approximately 105-110° C.) is reached, but not the ignition temperature of the gas.

According to a structurally simple aspect, the triggering device has a heating coil with which the thermally activatable safety valve is at least partially enwrapped. It may be provided that the safety valve as a whole is enwrapped, or that only a glass ampule belonging to the safety valve is enwrapped, with the heating coil and possibly insulated, self-evidently with a combustible material in order to ensure the functionality in the event of a fire. It would likewise be possible for the heating coil to be integrated into a wall of a glass ampule provided in the thermally activatable safety valve. In the two latter cases, less energy is required to activate the safety valve.

In an alternative embodiment, the evacuation device comprises a mechanical or pyrotechnic actuator. An example of a mechanical actuator is a piezo actuator which, when activated, destroys a glass ampule of the safety valve.

To prevent possible misuse, the terminals for the external energy source may be arranged in an interior compartment of the motor vehicle.

Alternatively or in addition, the evacuation device may have a breaker switch which is open during normal driving operation and which is closed by a crash signal from a vehicle safety system. Then, too, it is ensured that the evacuation device can be activated only in a demand situation, specifically, after an accident.

As already mentioned, the pressurized gas is in particular hydrogen or natural gas, preferably, compressed natural gas (CNG).

The objects of the invention are likewise achieved by way of a method for the evacuation of a storage vessel for a pressurized gas in a motor vehicle, which method is used in particular in a system of the type described herein. The method according to the invention has the following steps: an external energy source is, in a demand situation, connected to an evacuation device provided on the storage vessel, and the external energy source is activated for the purposes of targetedly evacuating the storage vessel by way of the evacuation device thus activated.

A "demand situation" is to be understood as including, for example, an accident. By contrast to an immediate activation of the evacuation device as a result of the accident event itself, for example, by way of an active vehicle safety system, the method according to the invention is distinguished by the fact that the storage vessel is evacuated only when there is a demand and after a time delay. Vehicle occupants can therefore firstly be rescued before gas emerges, which could ignite during the evacuation. The provision of the energy required for the evacuation device by way of an external energy source furthermore ensures that the evacuation of the storage vessel can be performed even if a vehicle-internal electrical supply fails.

According to an aspect of the method according to the invention, the evacuation device comprises a triggering device which is provided on a thermally activatable safety valve for the evacuation of the storage vessel, which safety valve self-activates in the presence of a correspondingly high temperature. The external energy source is activated in order to targetedly trigger the safety valve. Thus, the thermally activatable safety valve that is present in any case is utilized to permit targeted evacuation of the storage vessel in accordance with demand.

All of the aspects and advantages mentioned with reference to the system according to the invention likewise apply to the method according to the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
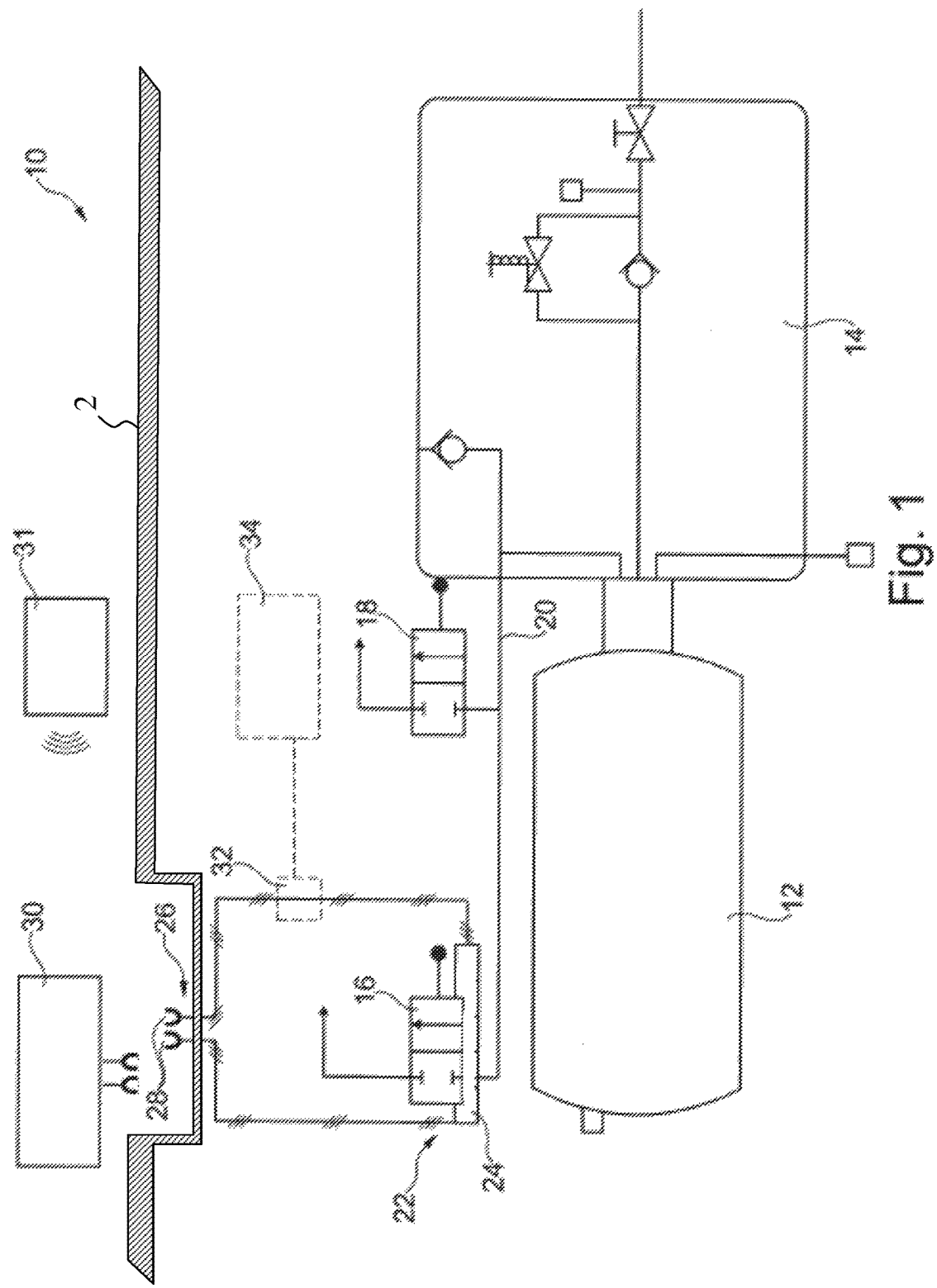
FIGS. 1 and 2 shows a schematic views of systems for storing a pressurized gas in a motor vehicle according to the invention.
Figure 2:
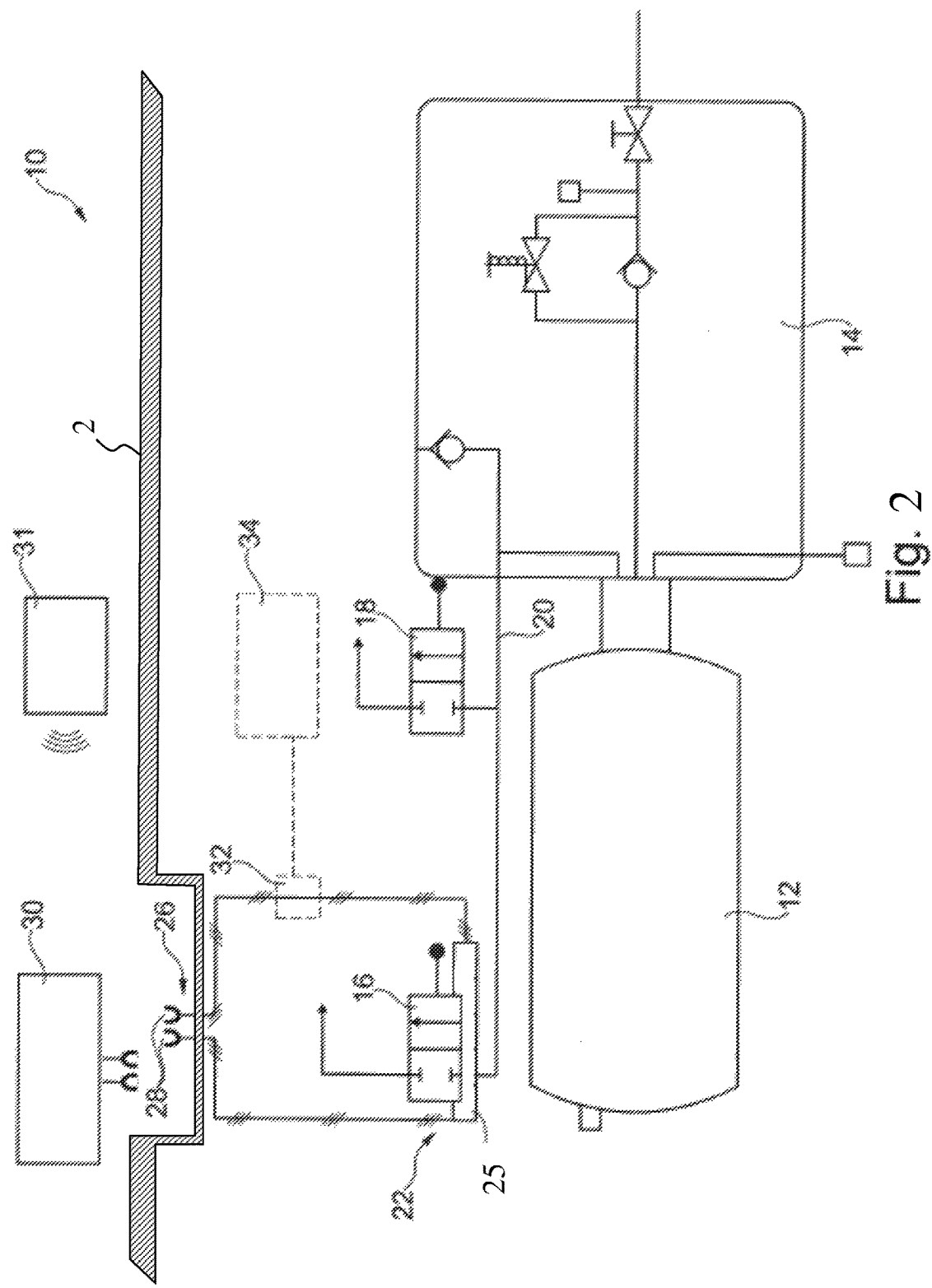

FIGS. 1 and 2 show a system 10 for storing a pressurized gas in a motor vehicle 2. The gas is in particular hydrogen or natural gas. The system 10 has a storage vessel 12 for the pressurized gas. On the storage vessel there is provided a tank valve 14 for the purposes of supplying the gas to, for example, an engine. The tank valve 14 comprises various valves and temperature and/or pressure sensors, which are combined in the tank valve 14. Since the tank valve 14 is known per se and, furthermore, the exact mode of operation thereof is not relevant to the present invention, a more detailed description will be omitted at this juncture.

Furthermore, the system 10 has two thermally activatable safety valves 16, 18 (also referred to as TPRD) arranged in parallel with respect to one another, which are coupled via a line 20. Line 20 also couples the safety valves 16, 18 to the tank valve 14 and to the storage vessel 12.

The safety valves 16, 18 may for example have a closure compound which is arranged in a flow path of the gas. In the presence of a correspondingly high temperature of approximately 105-110° C. in the region of one of the safety valves 16, 18, the compound melts, and the respective safety valve 16, 18 becomes permeable to the gas stored in the storage vessel 12. That is to say the safety valve 16, 18 self-activates in this way. Thus, in the event of a fire, the pressurized gas is released from the storage vessel 12. Alternatively, the safety valves 16, 18 may comprise a fluid-filled glass ampule which, in the presence of a correspondingly high temperature, bursts and allows the gas to escape from the storage vessel 12.

Furthermore, on the safety valve 16, there is provided a triggering device 22 which forms an additional activatable evacuation device for the storage vessel 12. The triggering device 22 comprises a thermal actuator in the form of an electric heater 24, which is arranged on the safety valve 16 and is in the form of a heating resistor. The triggering device 22 furthermore has an interface 26 which comprises electrical terminals 28 for an external energy source 30. The interface 26 or the terminals 28 is/are arranged in an easily accessible region of the motor vehicle 2, in particular, in a region of the motor vehicle that is accessible from the outside.

In a demand situation, for example, in the event of an accident in which the storage vessel 12 could be damaged such that the safe storage of the pressurized gas is no longer ensured, the external energy source 30 is connected to the interface 26, or more precisely to the terminals 28, of the triggering device 22 and, after any persons present have been moved to safety, is targetedly externally activated, in particular, by radio or via an electrical ignition line (indicated in the FIGURE by reference designation 31). After activation of the external energy source 30, electrical current flows through the heater 24, and the heater warms up to a temperature sufficient to targetedly trigger the safety valve 16 and thus evacuate the storage vessel 12.

To prevent evacuation of the storage vessel 12 by misuse, the evacuation or triggering device 22 may have a breaker switch 32 that is open during normal driving operation and that is closed only by a crash signal of a vehicle safety system 34. Alternatively or in addition, the terminals 28 may be arranged in an interior compartment of the motor vehicle.

Alternatively to the electrical heater 24, the evacuation or triggering device 22 may comprise a mechanical or pyrotechnic actuator 25 which, for example, when activated, destroys a glass ampule of the safety valve 16.

Thus, in the system 10, the storage vessel 12 is targetedly evacuated on-site after an accident, whereby bursting of the vessel during rescue work, transportation, or storage after the accident (that is to say not in the period of time immediately after the accident event) can be prevented. Since, particularly in the case of hydrogen, there is the risk of the gas igniting during the evacuation of the storage vessel 12, the accident site should be cleared before the evacuation is performed. Furthermore, ignition sources should be avoided, and the measure must not be performed in closed spaces, under bridges or in tunnels.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for storing a pressurized gas in a motor vehicle, comprising: a storage vessel storing the pressurized gas; at least one thermally activatable safety valve for the evacuation of the storage vessel, the safety valve self-activating in the presence of a correspondingly high temperature; and a triggering device that is activatable to evacuate the storage vessel via the safety valve, the triggering device having an interface, which activates to evacuate the storage vessel when electrically connected to an energy source that, prior to a demand situation calling for the storage vessel to be targetedly evacuated, is physically and electrically separate from the motor vehicle, but that, in the demand situation, may be brought into electrical contact with the interface so as to activate the triggering device to targetedly evacuate the storage vessel.

2. The system according to claim 1, wherein:
the triggering device is provided on the safety valve, and includes the interface, and
the energy source is connectable to the interface of the triggering device for the purposes of targetedly triggering the safety valve.

3. The system according to claim 1, wherein the interface has terminals connectable to the energy source and arranged in a region of the motor vehicle that is accessible from the outside.

4. The system according to claim 3, wherein the terminals are electrical terminals.

5. The system according to claim 1, wherein the energy source can, after connecting to the triggering device, be activated in order to evacuate the storage vessel.

6. The system according to claim 5, wherein the activation is performed by remote control or via an electrical ignition line.

7. The system according to claim 5, wherein the remote control activation is via radio.

8. The system according to claim 2, wherein the triggering device has a thermal actuator.

9. The system according to claim 8, wherein the thermal actuator is an electric heater.

10. The system according to claim 8, wherein the triggering device has a heating coil with which the safety valve is at least partially enwrapped.

11. The system according to claim 1, wherein the triggering device comprises a mechanical or pyrotechnic actuator.

12. The system according to claim 1, wherein the interface has terminals that are connectable to the energy source and are arranged in an interior compartment of the motor vehicle.

13. The system according to claim 1, wherein the triggering device has a breaker switch, which is open during normal driving operation, and which is closed by a crash signal from a vehicle safety system.

14. A method for the evacuation of a storage vessel for a pressurized gas in a motor vehicle, the method comprising the acts of: maintaining, prior to a demand situation, an energy source physically and electrically separate from a triggering device provided on a safety valve of the storage vessel, wherein the demand situation calls for the storage vessel to be targetedly evacuated; connecting, in the demand situation, the energy source to the triggering device, and activating the energy source such that the storage vessel is targetedly evacuated by way of the triggering device via the safety valve.

15. A triggering device for use with a self-actuated safety valve configured to evacuate a pressurized gas storage vessel of a motor vehicle, the triggering device comprising: an interface, which activates to evacuate the pressurized gas storage vessel when electrically connected to an energy source that, prior to an on-demand situation calling for the pressurized gas storage vessel to be targetedly evacuated, is physically and electrically separate from the motor vehicle, but that, in the on-demand situation, may be brought into electrical contact with the interface so as to activate the triggering device to targetedly evacuate the pressurized gas storage vessel via the self-actuated safety valve.

16. The triggering device according to claim 15, wherein the triggering device is configured to activate only after an on-demand coupling with the energy source.

17. The triggering device according to claim 15, further comprising a breaker switch configured to close from a normal open configuration in response to a crash signal of a vehicle safety system.

18. The triggering device according to claim 16, wherein the interface has terminals configured to couple with the energy source so as to activate the triggering device.

19. The triggering device according to claim 18, wherein the terminals are accessible from an interior of the motor vehicle.

20. The triggering device according to claim 15, wherein the triggering device includes a heating coil partially enwrapping the self-actuated safety valve.

\* \* \* \* \*